United States Patent Office 3,209,011
Patented Sept. 28, 1965

3,209,011
3-[(ALKYLCARBAMOYL)SULFAMOYL]-1-ALKYL-INDOLE-2-CARBOXYLIC ACIDS AND ESTERS THEREOF
Jacob Szmuszkovicz, Kalamazoo, Mich., assignor to The Upjohn Company, Kalamazoo, Mich., a corporation of Delaware
No Drawing. Filed Oct. 7, 1963, Ser. No. 314,531
3 Claims. (Cl. 260—319)

The present invention relates to novel indoles and more particularly relates to 3-[(alkylcarbamoyl)sulfamoyl]-1-alkylindole-2-carboxylic acids and esters thereof.

The novel compounds of the present invention can be represented by the formula:

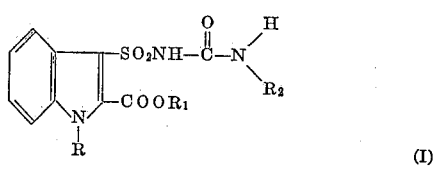

(I)

wherein R and $R_2$ represent alkyl of 1 to 4 carbon atoms, inclusive, and $R_1$ represents hydrogen and alkyl of 1 to 4 carbon atoms, inclusive. Representative alkyl radicals include, e.g., methyl, ethyl, propyl, isopropyl, butyl, isobutyl and the like.

The novel 3-[(alkylcarbamoyl)sulfamoyl] - 1 - alkyl-indole-2-carboxylic acid esters can be prepared in known manner by reacting a 3-sulfamoyl-1-alkylindole - 2 - carboxylic acid ester having the formula:

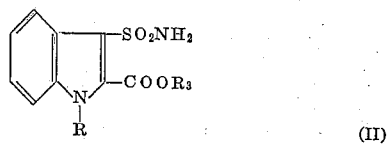

(II)

wherein R has the above value and $R_3$ represents alkyl of 1 to 4 carbon atoms, inclusive, with an alkyl isocyanate having the formula:

$$R_2NCO \quad (III)$$

wherein $R_2$ has the above value.

The novel esters of 3-sulfamoyl-1-alkylindole-2 - carboxylic acids (Formula II) can be prepared by oxidizing with potassium permanganate a novel ester of a 3-(aminosulfinyl)-1-alkylindole-2-carboxylic acid having the formula:

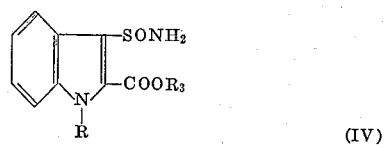

(IV)

wherein R and $R_3$ have the above values. The reaction is carried out in the presence of an inert solvent such as aqueous lower-alkyl ketones, e.g., acetone, methyl ethyl ketone, and the like. Advantageously, the reaction is carried out at temperatures ranging between about 0° C. and about 50° C., preferably between about 20° C. and about 30° C. The molar ratio of potassium permanganate to compound of Formula IV advantageously ranges from about 1:1.25 to about 1:1.75, and preferably is about 1:1.5.

The novel esters of 3-(aminosulfinyl)-1-alkylindole-2-carboxylic acids (Formula IV) are produced by reacting an ester of a 3-(halosulfinyl)-1-alkylindole-2-carboxylic acid having the formula:

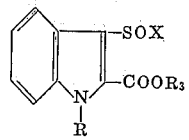

(V)

wherein R and $R_3$ have the above values and X represents halogen, e.g., chlorine and bromine, with anhydrous ammonia. The reaction is advantageously carried out in the presence of an inert solvent such as ether, benzene, tetrahydrofuran, 1,2-dimethoxyethane, and the like, at a temperature between about −70° C. and about 25° C.

The esters of 3-(halosulfinyl)-1-alkylindole-2-carboxylic acids (Formula V) are prepared by reacting an ester of a 1-alkylindole-2-carboxylic acid having the formula:

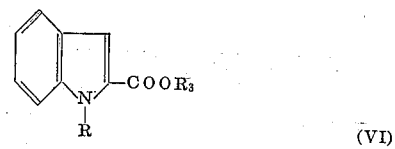

(VI)

wherein R and $R_3$ have the above values, with a thionyl halide, e.g., thionyl chloride (preferred) or thionyl bromide, at a temperature between about zero and about 35° C., preferably between about 20° C. and about 30° C. The reaction is advantageously carried out in the presence of an inert solvent, e.g., ether, benzene, chloroform, methylene chloride, 1,2-dichloroethane, and the like.

Esters of 1-alkylindole-2-carboxylic acids (Formula VI) employed in the preparation of esters of 3-(halosulfinyl)-1-alkylindole-2-carboxylic acids (Formula V) can be prepared by (1) utilizing the process disclosed by Brehm, J. Amer. Chem. Soc. 71, 3541, 1949, to prepare esters of indole-2-carboxylic acid having the formula:

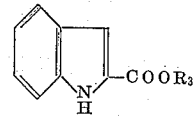

wherein $R_3$ has the above value, and (2) alkylating the indole nucleus at the 1-position. Brehm prepared ethyl indole-2-carboxylate by reducing and cyclizing ethyl o-nitrophenylpyruvate with halogen in the presence of Adams platinum catalyst. The starting ethyl o-nitrophenylpyruvate was prepared by reacting o-nitrotoluene with diethyl oxalate in accordance with the procedure disclosed by Wislicenus et al., Ann., 436, 45, 1924. By substituting other dialkyl oxalates for diethyl oxalate other suitable esters of o-nitrophenylpyruvic acid which can be utilized herein are prepared. The reduction and cyclization of the pyruvic acid ester can also be accomplished with zinc dust and acetic acid. The 1-alkylation can be carried out with an alkyl halide in the presence of an alkaline condensing agent such as alkali-metal amides or alkali-metal hydrides.

Esters of 1-alkylindole-2-carboxylic acids (Formula VI) can also be prepared by utilizing the process disclosed by Johnson et al., J. Amer. Chem. Soc., 67, 423, 1945. Johnson et al. prepared methyl 1-methylindole-2-carboxylate and ethyl 1-methylindole-2-carboxylate by cyclizing the 2-methyl-2-phenylhydrazone of pyruvic acid in the presence of an acid medium in accordance with the well-known Fischer indole synthesis, and then esterifying the resulting 1-methylindole-2-carboxylic acid with methanol and hydrogen chloride and ethanol and hydrogen chloride, respectively. This process can also be employed to produce other starting 1-alkylindole-2-carboxylic acid esters by utilizing suitably substituted phenylhydrazines in the preparation of phenylhydrazones of pyruvic acid and employing other alcohols in the esterification step.

The novel 3-[(alkylcarbamoyl)sulfamoyl] - 1 - alkylindole-2-carboxylic acids (Formula I; $R_1$=hydrogen) can be readily produced by saponification of the novel esters of 3-[(alkylcarbamoyl)sulfamoyl]-1-alkylindole-2 - carboxylic acids in known manner.

The compounds of the present invention (Formula I) are characterized by sedative activity. Additionally, the esters (Formula I; $R_1$=alkyl) are characterized by diuretic activity and the acids (Formula I; $R_1$=hydrogen) by antifungal activity, e.g., against *Trichophyton rubrum*.

In addition, the novel compounds exhibit high absorption of radiation in the wave-length range of 280–300 millimicrons and accordingly can be employed as effective sun screens when incorporated in suitable vehicles such as transparent film-forming compositions and oils.

The following examples are illustrative of the process and product of the present invention, but are not to be construed as limiting.

EXAMPLE 1.—METHYL 3-[(BUTYLCARBAMOYL)-SULFAMOYL]-1-METHYLINDOLE - 2 - CARBOXYLATE

A. *Methyl 1-methyl-3-(chlorosulfinyl)indole-2-carboxylate*

Thionyl chlorate (5 ml.) was added to solid methyl 1-methylindole-2-carboxylate (1.89 g.; 0.01 mole). Solution occurred, followed by vigorous evolution of gas and then solidification. The mixture was allowed to stand for 5 minutes, 15 ml. of anhydrous ether was added, the solid was triturated, filtered, and washed with ether. The solid, methyl 1-methyl-3-(chlorosulfinyl)indole-2 - carboxylate, was dried under reduced pressure for 10 minutes, weighed 2.45 g. and melted at 85–88° C. (dec.).

B. *Methyl 1-methyl-3-(aminosulfinyl)indole-2-carboxylate*

Methyl 1-methyl-3-(chlorosulfinyl)indole-2-carboxylate prepared from 0.2 mole of methyl 1-methylindole-2-carboxylate was added during 3 minutes to a solution of 150 ml. of liquid ammonia in 300 ml. of ether with stirring and cooling to about −50° C. in a cold bath. The suspension was then stirred for an additional 5 minutes and the cold bath was replaced with tap water to evaporate excess ammonia. Ether was then evaporated under reduced pressure, 200 ml. of water was added, and the solid was filtered and washed well with water (3 portions, each of 100 ml.). Recrystallization from a mixture of 100 ml. of methanol and 100 ml. of water afforded 47.5 g. (94.5% yield) of methyl 1-methyl-3-(aminosulfinylindole-2-carboxylate which melted at 111–116.5° C.

*Analysis.*—Calcd. for $C_{11}H_{12}N_2O_3S \cdot \frac{1}{4}H_2O$: C, 51.44; H, 4.74; N, 11.17; S, 12.49; $OCH_3$, 12.08. Found: C, 51.27; H, 4.47; N, 11.43; S, 13.01; $OCH_3$, 11.36.

C. *Methyl 1-methyl-3-sulfamoylindole-2-carboxylate*

A solution of potassium permanganate (5.25 g.; 0.0332 mole) in 110 ml. of water was added during 15 minutes with stirring to a solution of methyl 1-methyl-3-(aminosulfinyl)indole-2-carboxylate (12.6 g.; 0.05 mole) in 500 ml. of acetone, keeping the temperature at 22–25° C. by occasional cooling. The mixture was then stirred for 1.5 hours. A saturated aqueous solution of sodium sulfite (3 ml.) was added, the mixture was filtered, and the precipitate was washed with acetone. The combined filtrate and washings were evaporated under reduced pressure at 35° C. to remove acetone, the resulting aqueous suspension was filtered, and the filter cake consisting of methyl 1-methyl-3-sulfamoylindole - 2 - carboxylate was washed with water and then dried. The yield was 8.3 g. (62% yield) and the compound melted at 167–170° C. Upon recrystallization from methanol the compound melted at 168.5–170° C.

*Analysis.*—Calcd. for $C_{11}H_{12}N_2O_4S$: C, 49.24; H, 4.51; N, 10.44; S, 11.95. Found: C, 49.11; H, 4.51; N, 10.36; S, 12.11.

D. *Methyl 3-[(butylcarbamoyl)sulfamoyl]-1-methyl-indole-2-carboxylate*

Triethylamine (94 ml.), followed by butyl isocyanate (19.8 g.; 0.2 mole) was added to a suspension of methyl 1-methyl-3-sulfamoylindole-2 - carboxylate (53.7 g.; 0.2 mole) in 50 ml. of dimethylformamide. The mixture was stirred for 22 hours and two clear layers resulted. Water (350 ml.) was added and the mixture was stirred for 30 minutes, during which time a small amount of solid appeared. The mixture was extracted with ether (100 ml.) and the clear aqueous layer was acidified with 5% hydrochloric acid with cooling. The resulting oil solidified after a few minutes. The product was filtered, washed with water, and crystallized from ethanol to give 46.75 g. (63% yield) of methyl 3 - [(butylcarbamoyl)sulfamoyl] - 1-methylindole-2-carboxylate in three crops. On recrystallization from methanol the product melted at 191–192° C. Ultraviolet spectrum (in 95% ethanol) showed λ max. 210 (32,400); sh. 236 (11,350); 292 (10,900).

*Analysis.*—Calcd. for $C_{16}H_{21}N_3O_5S$: C, 52.31; H, 5.76; N, 11.44; S, 8.73; $OCH_3$, 8.45. Found: C, 52.41; H, 5.44; N, 11.60; S, 8.96; $OCH_3$, 8.11.

In the same manner as shown above, methyl-3[(propylcarbamoyl)sulfamoyl]-1-methylindole - 2 - carboxylate, methyl-3[(ethylcarbamoyl)sulfamoyl]-1-methylindole - 2-carboxylate, and methyl 3[(methylcarbamoyl)sulfamoyl]-1-methylindole-2-carboxylate were prepared by substituting propyl isocyanate, ethyl isocyanate, and methyl isocyanate, respectively, for butyl isocyanate.

EXAMPLE 2.—3-[BUTYLCARBAMOYL)SULFAMOYL]-1-METHYLINDOLE-2-CARBOXYLIC ACID

A solution of methyl 3-[(butylcarbamoyl)sulfamoyl]-1-methylindole-2-carboxylate (36.6 g.; 0.1 mole) in aqueous sodium hydroxide (200 ml. of 1 N sodium hydroxide diluted to 700 ml.) was heated on the steam bath for 2 hours. The mixture was cooled in ice and acidified with 35 ml. of concentrated hydrochloric acid. The resulting solid was filtered and washed with water. It was crystallized from aqueous acetone to give 27 g. (77% yield) of 3-(butylcarbamoyl)sulfamoyl]-1-methylindole-2 - carboxylic acid which melted at 194° C. (effevescence). Ultraviolet spectrum (in 95% ethanol) showed λ max. 212 (33,950); sh. 222 (29,450); sh. 282 (10,050); 286 (10,650); sh. 300 (5,900).

*Analysis.*—Calcd. for $C_{15}H_{19}N_3O_5S$: C, 50.99; H, 5.42; N, 11.89; S, 9.08; N.E., 176.7. Found: C, 51.00; H, 5.06; N, 11.60; S, 9.04; N.E., 175.0.

In the same manner as shown above, 3-[(propylcarbamoyl)sulfamoyl]-1-methylindole-2 - carboxylic acid, 3-[(ethylcarbamoyl)sulfamoyl]-1-methylindole - 2 - carboxylic acid, and 3 - [(methcarbamoyl)sulfamoyl] - 1-methylindole-2-carboxylic acid were prepared by substituting methyl 3-[(propylcarbamoyl)sulfamoyl]-1 - methylindole-2-carboxylate, methyl 3 - [(ethylcarbamoyl)sulfamoyl]-1-methylindole - 2 - carboxylate, and methyl 3-[(methylcarbamoyl)sulfamoyl]-1-methylindole - 2 - carboxylate, respectively, for methyl 3-[(butylcarbamoyl)sulfamoyl]-1-methylindole-2-carboxylate.

EXAMPLE 3.—ETHYL 3-[(ETHYLCARBAMOYL) SULFAMOYL] - 1 - ETHYLINDOLE - 2 - CARBOXYLATE

In the same manner as shown in Example 1, ethyl 3 - [(ethylcarbamoyl)sulfamoyl] - 1 - ethylindole - 2-carboxylate was prepared by substituting ethyl 1-ethylindole-2-carboxylate and ethyl isocyanate for methyl 1-methylindole-2-carboxylate and butyl isocyanate, respectively.

The ethyl 3 - [(ethylcarbamoyl)sulfamoyl] - 1 - ethylindole-2-carboxylate was saponified in the same manner as set forth in Example 2 to produce 3-[(ethylcarbamoyl) sulfamoyl]-1-ethylindole-2-carboxylic acid.

EXAMPLE 4.—PROPYL 3-[(PROPYLCARBAMOYL) SULFAMOYL] - 1 - PROPYLINDOLE - 2 - CARBOXYLATE

In the same manner as shown in Example 1, propyl 3 - [(propylcarbamoyl)sulfamoyl] - 1 - propylindole - 2-carboxylate was prepared by substituting propyl 1-propylindole-2-carboxylate and propyl isocyanate for methyl 1-methylindole-2-carboxylate and butyl isocyanate, respectively.

The propyl 3-[(propylcarbamoyl)sulfamoyl]-1-propylindole-2-carboxylate was saponified in the same manner as set forth in Example 2 to produce 3-[(propylcarbamoyl)sulfamoyl]-1-propylindole-2-carboxylic acid.

EXAMPLE 5.—BUTYL 3 - [(BUTYLCARBAMOYL) SULFAMOYL] - 1 - BUTYLINDOLE - 2 - CARBOXYLATE

In the same manner as shown in Example 1, butyl 3 - [(butylcarbamyl)sulfamoyl] - 1 - butylindole - 2-carboxylate was prepared by substituting butyl 1-butylindole-2-carboxylate for methyl 1-methylindole-2-carboxylate.

The butyl 3 - [(butylcarbamoyl)sulfamoyl] - 1 - butylindole-2-carboxylate was saponified in the same manner as set forth in Example 2 to produce 3-[(butylcarbamoyl)sulfamoyl]-1-butylindole-2-carboxylic acid.

EXAMPLE 6.—PROPYL 3 - [(METHYLCARBAMOYL)SULFAMOYL] - 1 - ETHYLINDOLE - 2 - CARBOXYLATE

In the same manner as shown in Example 1, propyl 3 - [(methylcarbamoyl)sulfamoyl] - 1 - ethylindole - 2-carboxylate was prepared by substituting propyl 1-ethylindole-2-carboxylate and methyl isocyanate for methyl 1-methylindole-2-carboxylate and butyl isocyanate, respectively.

The propyl 3-[(methylcarbamoyl)sulfamoyl]-1-ethylindole-2-carboxylate was saponified in the same manner as set forth in Example 2 to produce 3-[(methylcarbamoyl)sulfamoyl]-1-ethylindole-2-carboxylic acid.

I claim:
1. A compound of the formula:

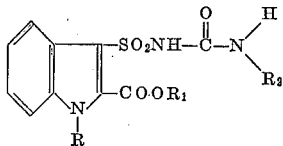

wherein R and $R_2$ are alkyl of 1 to 4 carbon atoms, inclusive, and $R_1$ is selected from the group consisting of hydrogen and alkyl of 1 to 4 carbon atoms, inclusive.

2. Methyl 3-[(butylcarbamoyl)sulfamoyl]-1-methylindole-2-carboxylate.

3. 3 - [(butylcarbamyl)sulfamoyl] - 1 - methylindole-2-carboxylic acid.

References Cited by the Examiner

UNITED STATES PATENTS 3,102,115   8/63   Breuer et al. _____ 260—319

OTHER REFERENCES

Burger (Ed.), Medicinal Chemistry, 2nd Edition, Interscience Publishers, Inc., New York, 1960, page 1144.

Gillette et al., Progress in Drug Research, vol. 6, Birkhauser Verlag, Switzerland, 1963, pages 132–138.

Kunori, Chem. Abstracts, vol. 55, 1961, p. 5457, Abstract of Nippon Kagaku Zasshi, vol. 80, 1959, page 407.

NICHOLAS S. RIZZO, *Primary Examiner.*